United States Patent [19]

Cross et al.

[11] 3,775,176

[45] Nov. 27, 1973

[54] METHOD OF FORMING AN ELECTROPLATABLE MICROPOROUS FILM WITH EXPOSED METAL PARTICLES WITHIN THE PORES

[75] Inventors: Robert A. Cross, Harvard; Anthony J. Testa, Westwood, both of Mass.; Ralph N. Thompson, Pittsburgh, Pa.

[73] Assignee: Amicon Corporation, Lexington, Mass.

[22] Filed: Feb. 23, 1971

[21] Appl. No.: 118,090

Related U.S. Application Data

[63] Continuation-in-part of Ser. No. 661,555, Aug. 18, 1967, abandoned.

[52] U.S. Cl. .................. 117/227, 117/63, 117/160, 117/138.8 A, 117/138.8 UA, 156/3, 204/30, 204/38 B
[51] Int. Cl. ......................... B44d 1/18, C23f 17/00
[58] Field of Search .................. 204/30, 38, 20–22; 117/47 A, 213, 218, 219, 212, 135.5, 160, 138.8, 227; 156/2, 3; 264/49

[56] References Cited

UNITED STATES PATENTS

| | | | |
|---|---|---|---|
| 3,576,662 | 4/1971 | Diebold et al. | 117/160 R |
| 3,332,860 | 7/1967 | Diebold et al. | 204/38 |
| 3,347,724 | 10/1967 | Schneble, Jr. et al. | 204/30 |
| 3,267,007 | 8/1966 | Sloan | 204/38 |
| 3,305,460 | 2/1967 | Lacy | 204/20 |
| 3,522,339 | 7/1970 | Velde | 156/3 |
| 2,360,650 | 10/1944 | Crane | 156/2 |
| 3,466,232 | 9/1969 | Francis et al. | 204/30 |
| 3,014,818 | 12/1961 | Campbell | 117/138.8 |
| 3,259,559 | 7/1966 | Schneble et al. | 204/38 |
| 3,632,704 | 1/1972 | Coll-Palages | 117/47 A |

FOREIGN PATENTS OR APPLICATIONS

| | | | |
|---|---|---|---|
| 876,858 | 9/1961 | Great Britain | 204/20 |

*Primary Examiner*—Daniel E. Wyman
*Assistant Examiner*—P. E. Konopka
*Attorney*—F. W. Furlong

[57] ABSTRACT

Rendering non-conductive substrates electroplatable by firmly bonding and uniting thereto an electroplate-receptive coating comprising a film-forming thermoplastic organic polymer and electrically conductive metallic particles having a largest dimension in the range of about 0.02 to 50 microns, the solids portion of the coating comprising at least about 20 percent by volume of a film-forming polymer and at least about 25 percent by volume of metallic particles, the coating further having a microporous structure to a depth of at least about 1 micron from the exposed surface thereof, and this microporous structure having about 40 to 90 percent open space, with the major portion of the open space being provided by pores with a largest dimension between about 0.1 to 15 microns, and with the metallic particles exposed in this microporous structure.

1 Claim, No Drawings

METHOD OF FORMING AN ELECTROPLATABLE MICROPOROUS FILM WITH EXPOSED METAL PARTICLES WITHIN THE PORES

This application is a continuation-in-part of our co-pending application, Ser. No. 661,555, filed Aug. 18, 1967, now abandoned.

It has long been an object of the electroplating industry to provide economical, effective, and convenient means to coat or decorate a variety of non-metallic articles. In recent years the need for such a versatile process for use in electroplating a rapidly growing variety of plastics has become more acute. Nevertheless, until the instant invention, all processes available in the art were severely limited in their utility, typically by one or more of the following factors:

1. poor adhesion of the electroplated coating to the non-conductive substrates;
2. utility with only a very few special plastics as substrates;
3. necessity of using a great number of processing steps to get the substrate ready for electroplating, typically about nine distinct steps; and
4. poor appearance, e.g., insufficient smoothness or uniformity on the resulting coated product.

Thus it is an object of the present invention to provide a simple process for electroplating non-conductive structures which process allows the choice of any of a large number of non-conductive materials for fabrication of the article to be electroplated.

It is a further object of the invention to provide novel priming compositions useful in the process of the invention.

Another object of the invention is to provide novel articles of manufacture which are susceptible of convenient electroplating.

A still further object of the invention is to provide novel electroplated articles of manufacture having a strongly-bonded metallic coating of excellent appearance.

Other objects of the invention will become obvious to those skilled in the art on reading this specification.

The invention features applying to an electrically non-conductive substrate a novel electroplate-receptive coating firmly bonded and united to the substrate. This coating comprises a film-forming water-insoluble thermoplastic organic polymer and electrically conductive metallic particles having a largest dimension in the range of about 0.02 to 50 microns. The solids portion of the coating is at least about 20 percent by volume of the film-forming thermoplastic organic polymer and at least about 25 percent by volume of the electrically conductive metallic particles. The coating has a microporous structure to a depth of at least about 1 micron from the exposed surface. This microporous structure has about 40 to 90 percent (preferably, about 75 to 90 percent) open space, and the major portion of the open space is provided by pores with a largest dimension between about 0.1 to 15 microns, with the conductive metallic particles being exposed in the coating.

In preferred embodiments, the solids portion of the coating is about 50 to 80 percent by volume of metal particles of which at least the major portion by weight has a largest dimension between about 1 and 10 microns. Where the coating is sufficiently thick, the microporous structure may extend to a depth of 10 microns or even more to provide a particularly receptive coating. The coating is preferably open-celled in the microporous portion with substantial interconnection between pores.

The coating may be applied in any total thickness, so long as it has the microporous structure described at its exposed surfaces. Such coatings are generally applied in thicknesses ranging from 0.1 to 20 mils.

It is usually desirable to subject the coated substrate to a conventional preplating step before preceding with the conventional electroplating procedure. This preplating is accomplished in a relatively high-acid preplate bath. Normally a chemical displacement type preplate suffices; the metallic atoms from the preplate bath displace atoms of the conductive filler and thus avoid unnecessary contamination of the electroplating bath with ions of the conductive particles. Moreover, a more strongly adherent electroplate coat appears to result from use of the preplate step.

In general, the preplating step is used to reduce the electrical resistance of the coating on the substrate before it is subjected to the usually electroplating procedure. For example, coatings comprising tin powder have very little conductivity until the preplate step is carried out thereon. The preplate step will normally increase the conductivity of the surface until it has a surface resistivity of less than about 1,500 ohms/square as measured with a Triplett Electronic Volt-Ohm meter, Model 850. The preplate step allows use of coatings having very little, indeed almost no initial electrical conductivity, and is conveniently carried out at 20° to 30°C for from 2 to 5 minutes in a sulfuric acid bath comprising 188 grams of $CuSO_4$, 148 grams of $H_2SO_4$ and 1,000 grams of water. However, fairly broad changes in the sulfuric acid and copper-ion concentrations can be tolerated.

Among the useful film-forming water-insoluble thermo-plastic organic polymers forming the coatings of the present invention are polyvinyl acetate, polyvinyl butyrate, polyvinyl chloride, polyvinyl fluoride, polycarbonate, polyvinyl butyral, polyvinyl alcohols (e.g., high molecular weight ($10^6$ or greater) or cross-linked), polyvinyl methyl ether, polyvinylidene chloride, poly-vinylidene fluoride, water-insoluble divalent salts of carboxy-methylcellulose, polyurethanes, polyacrylonitrile, polysulfones, polyarylsulfones, polymethyl methacrylate, cellulose acetate and the like. Other such polymers include various copolymers such as polyvinyl chloride-polyvinyl acetate, polyvinyl chloride-polyacrylonitrile, poly (acrylonitrile-butadiene-styrene) copolymers and the like.

Those skilled in the art, on perusing the above list and reading the instant specification, will realize that the polymers are utilized manipulatively and any polymer can be utilized providing that film-forming coatings of the polymer can be prepared to provide the microporous substrate desired for suitable electroplating; and providing further that the polymer has sufficient "adhesive" affinity for the non-conductive substrate to adhere thereto or can be dissolved or dispersed in a liquid in which the non-conductive substrate has a degree of solubility. In this latter circumstance, a sufficiently strong "adhesive" bond can be induced between the non-conductive substrate and the microporous precoat to satisfy the requirements of the invention.

For preparing most of the non-conductive substrates for electroplating according to the invention, the relatively polar film-forming organic polymers known to the art are entirely satisfactory and indeed advantageously utilized because of the wide selection of solvents in which they can be suitably dissolved.

Since, with the described novel coatings, any failure of the electroplate, in terms of peel strength, will take place not at the electroplate-coating interface, but within the microporous structure of the applied coating; peel strength can be largely controlled by selection of a polymer of desirable strength.

Among the electrically conductive metallic particles that are useful in the coatings of the invention are those formed of the metals copper, tin, nickel, silver, iron, lead, cadmium, chrome, zinc, and mixtures and alloys of these with each other, and the like.

These particles should have a largest dimension in the range of about 0.02 to 50 microns. The smaller sizes are preferred when high-gloss plating is to be carried out; larger particle sizes are preferred for less glossy, e.g. satin finish coatings. They can be of any shape, for example spherical or acicular shapes such as chain-like or flake-like configurations.

Particularly advantageous are electrically conductive particles of "chained" or "highly-structured" configuration. This configuration may take the form of a chain-type agglomerate structure; similar to the well-known structure of such generally electrically non-conductive particles as pyrogenic silica and pyrogenic alumina. These electrically conductive particles are characterized by having a ratio of exposed surface area to weight, prior to being incorporated into the coating, in the range of about 500 to 1,500 or more $cm^2/gm$, many times the surface area to weight ratio of a spherical particle of equal weight. Preferably the major portion by weight of such particles in the coating have a largest dimension in the range of about 1 to 5 microns. Illustrative of such particles is the chain-type conductive nickel powder sold under the trade designation "Type 255 Carbonyl Nickel Powder" by The International Nickel Company, Inc. The major portion by weight of this powder is made up of particles having an average largest dimension in the range of about 2.5 to 3.5 microns. These 2.5 to 3.5 micron particles are composed of primary particles "chained" into the larger agglomerate paticles. The apparent density of this powder is about 0.5 to 0.6 grams per cc, with an exposed surface area to weight ratio estimated to be about 1000 $cm^2/gm$. Typical non-structured carbonyl nickel powders have an apparent bulk density at least about 70 to 500 percent greater than that of the Type 255 nickel mentioned above. This is so even when there is no substantial difference in the size of the particles being tested for apparent bulk density.

Of less structured conductive fillers, a tin powder sold under the trade name "MD 105" by Alcan Metal Powders, Inc. has been discovered to be highly advantageous.

Preferred methods for providing this microporous coating include evaporation and leaching. According to the evaporation method, a liquid composition is prepared comprising a solution of the film-forming polymer in a suitable solvent (preferably, about 9 to 25 percent polymer by volume), and metallic particles admixed with the solution. The relative proportions of polymer and metal particles are preferably about 20 to 50 parts (by volume) polymer to about 80 to 50 parts (by volume) particles, based on the total volume of polymer and metal particles. In accordance with the evaporation process, this liquid composition is applied to the substrate, and the solvent is evaporated at a temperature below its boiling temperature, yet at a rate sufficient to provide a blushed surface on the coating, to a depth of at least about 1 micron. Low boiling solvents (below about 80°C) with substantial vapor pressures (100 mm or more) below about 50°C are particularly useful. Although the choice of solvents depends largely, of course, upon the polymer to be dissolved, useful solvents for polar polymers include acetone, methyl acetate, ethyl acetate, tetrahydrofuran, methylene chloride, chloroform, methanol, ethylene dichloride and the like. Those skilled in the art will, on reading the above list, realize that a broad spectrum of solvents can be utilized and will be able to select a solvent suitable for their own conditions.

According to the leaching process, there is applied to the substrate a liquid composition comprising a solution of a film-forming thermoplastic organic polymer containing conductive metallic particles having a largest dimension in the range of about 0.02 to 50 microns, and a leachable component. Preferably, the volume of polymer is 20 to 50 percent and the volume of metal particles is 80 to 50 percent, based on the total volume of polymer and metal particles. The polymer volume should be 9–25 percent based on the total volume of solution plus leachable component (but excluding metal). The leachable component is a material which is soluble in a solvent or wash liquid which itself is a non-solvent for the polymer and metal. The composition is then evaporated to leave about 50 to 250 percent by volume of the leachable component, based on the volume of film-forming polymer. This partially complete coated substrate may (particularly if the leaching component is non-volatile) be maintained in this state until it is desired to finish making the coating. Then, the coated substrate containing the leachable component is exposed to the aforesaid solvent to remove this component, leaving a microporous structure in the applied coating. As will be evident, the leachable component may in some cases be a portion of the solvent in which the polymer is dissolved and in which the filler is slurried. Or it may be another liquid or a solid—preferably, a water-soluble solid.

Among materials which can be suitably incorporated into the coating composition as a leachable component are various inorganic and organic materials such as the water soluble salts of alkali and alkaline earths, including sodium bromide, potassium iodide, magnesium nitrate, calcium bromide, zinc chloride, barium chloride, cadmium nitrate, and the like. Other suitable water-soluble salts such as the soluble sulfates, nitrates, chlorides, perchlorates and the like are suitable, including e.g., copper sulfate, aluminum chloride, aluminum sulfate, ammonium nitrate, ammonium chloride, and ammonium sulfate. Other leachable materials include the water-miscible organic and inorganic liquids. For example, ethanol, dioxane, acetone, 2-butoxy ethanol, glycerine, dimethylformamide, ethyl acetate, dimethyl sulfoxide, ethylene glycol, propylene glycol, and the like are useful in the process of the invention, as are soluble organic solids such as carbohydrates like carboxymethyl-cellulose and acid-decomposable materials such as calcium carbonate and the like. It if often most convenient to allow a portion of a solvent used in forming the coating composition to stay in the coating after the evaporation step to serve as part or all of the leachable component thereof.

These leachable materials, too, are chosen primarily for their physical properties, and hence any material having the required solubility characteristics (and which, of course, is not otherwise reactive with the coating composition) can be used.

The wash liquid for reasons of safety and economy will usually be water. Were one to select a more exotic wash liquid and incorporate a leachable component into the coating composition of the invention which would be suitable leached by this exotic fluid, the requirements of the invention would still be satisfied.

In some embodiments within the scope of the invention it is possible that long-term deterioration of the microporous polymeric film can be caused by degradation of the film-forming polymer caused by the catalytic action of the metal ions resulting from interaction of residual moisture and the conductive fillers. In such situations use of a less polar wash fluid than water, for example ethanol, is indicated.

In most circumstances the surfaces of the non-conductive materials to be prepared for electroplating according to the process of the invention will adhere readily to the microporous precoat comprising the conductive fillers of the invention. This adherence will in some cases be primarily mechanical, as for example when a rough cement or ceramic substrate is coated. In some situations however, a chemical or mechanical treatment of the non-conductive surface will assure an optimum bond between the surface and microporous coating applied thereto. In one such case, the pretreatment with chlorosulfonic acid and sulfuric acid of an article of wood-flour-filled phenolic resin substrate sold under the trade name "BM–5000" by Union Carbide Corporation, resulted in increased bonding strength of electroplates, applied according to the invention, by about 20 percent.

Exemplary of the substrate materials receptive to such coatings are polystyrene, polymethyl methacrylate, acrylonitrile-butadiene-styrene copolymers, phenolic resins, and polydiallyl phthalate.

Moreover, for higher temperature applications, such heterocyclic, nitrogen-containing polymers as polyimides, polyamide copolymers, polyimidazolines, polyimidazoles and polyimidazolones are useful non-conductive polymeric substrates. Polybenzimidazole is an example of such a polymer.

The following examples are presented to illustrate the process of the invention and some of the novel products produced thereby. These examples are not intended to be limiting and various changes in conditions, proportions, and components can be made to fit the particular purposes of any skilled in the art.

EXAMPLE 1

Process

A solution was prepared comprising one part by weight of film-forming polymer, a polyvinyl acetate available under the trade designation LEMAC–1,000 from the Borden Chemical Company, and 9 parts N,N'-dimethylformamide (DMF) solvent. Then, 19 parts of a conductive filler, a spherical tin powder of about 1.5 microns in average particle diameter and available under the trade designation MD 105, from Alcan Metal Powders Incorporated, was mixed under high shear into the solution, thereby forming a slurry which was a coating composition according to the invention.

The resulting slurry was coated on a polystyrene article. A film coating 0.1 mil thick was applied to the pre-conditioned polymer surface by means of a Gardner drawdown bar. The slurry and substrate temperatures were both about 25°C during this coating step.

The film coating was partially dried in an air-circulating oven at 65°C. This "partial drying" removed all but about 15 percent of the solvent from the tin-polyvinyl acetate coating. Residual solvent was leached from the coating by submersing the coating in an agitated water bath for about 10 minutes at 30° to 35°C.

After being coated as shown above, the precoated polystyrene substrate was electroplated by 1. immersion in an acid copper sulfate solution, i.e. a pre-plating bath containing 188 grams $CuSO_4$, 148 grams $H_2SO_4$, and 1,000 grams of water, to form a thin coating of copper on the exposed tin by a chemical displacement reaction. Submersion time was 10 minutes. Temperature of the bath was about 28°C.
2. electroplating in a typical electrolytic plating bath comprising 188 grams of $CuSO_4$ and 74 grams of $H_2SO_4$ per 1,000 grams of water. This electroplating was carried out at about 28°C for 60 minutes using a current density of 12 amps/ft$^2$. The final electroplated coating was about 0.001 inch thick.

Testing for strength of electroplate-plastic bond

The metal layer and microporous precoat on a coated plastic plaque prepared as described above were cut to form distinct electroplated strips one inch wide and about 2 ½ inches long. About one-half inch of this strip was peeled back and a reinforcing tape was attached to both sides of the strip which had been peeled back. Thus prepared, the test specimens were conditioned for 4 hours at 70°F and 50 percent relative humidity.

The plaques are then mounted on a tensometer. One grip of the tensometer is attached to the reinforcing tape and a second grip holds the plaque in such a way as to maintain the angle of pull on the peeled-back strip of electroplated metal at 90° with respect to the electroplated surface of the plaque. The grips are caused to separate at a rate of 1 inch per minute until the entire metal strip is separated from the plastic. The "peel strength" is taken as the mean tensile value required to peel this 1 inch wide strip from the plaque. Normally several such mean values are averaged to obtain a reliable test result.

When the peel strength of the electroplated article of Example 1 was tested, it was found to be 3.2 lbs. per linear inch.

Effect of amount of solvent remaining in the coating after the wash step

The foregoing procedure was repeated several times, to establish the effect of evaporation of different quantities of solvent from the precoat before the leading step. The following results were obtained with amount of "residual solvent" by volume based on the volume of polymer solids.

| % Rsidual Solvent (i.e. no drying step) | Peel strength (lbs/inch) |
|---|---|
| 900 | 0.8 |
| 450 | 0.9 |
| 300 | 1.9 |
| 200 | 2.7 |

| | |
|---|---|
| 150 | 3.2 |
| 50 | 2.4 |
| 0 | 2.0 |

It is apparent that residual solvent quantities of between about 50 and 300 percent by volume based on the volume of polymer solids are advantageous. These quantities are believed to be proportional to the porosity of the leached precoat.

Effect of varying polymer substrates:

Substantially the same results were obtained when (a) an acrylonitrile-butadiene-styrene copolymer available under the trade designation EP–3510 from Marbon Chemical Division of Borg Warner Corporation, (b) a polymethyl methacrylate polymer available under the trade designation Plexiglas from Rohm & Haas Company, (c) a phenolic resin available under the trade designation BM–5000 from Union Carbide Corporation, (d) a polystyrene available under the trade designation KPD 901 from Sinclair-Koppers Company, and (e) a polydiallyl phthalate available under the trade designation 51–01 from Allied Chemical Corporation, were coated and electroplated according to the detailed procedure of coating and electroplating the polystyrene article of the instant example.

The aforesaid phenolic substrate was etched with chlorosulfonic acid for three minutes at 30°C before use.

EXAMPLE 2

The procedure of Working Example 1 was repeated except that the film-forming polymer was one part of polyvinyl chloride-polyvinyl acetate copolymer of the type available under the trade designation VYHH from B. F. Goodrich Company and the conductive filler was a flake-shaped copper powder and sold under the trade designation 1109 by Valley Metallurgical Processing Co. The article coated and plated was of acrylonitrile-butadiene-styrene copolymer.

Peel strengths of about 2.5 lbs. per inch were obtained. As was also true with test specimens of Example 1, failure was noted to take place within the matrix of the porous precoat rather than at the microporous coating-plastic article or microporous coating-electroplate interfaces.

EXAMPLE 3

The procedure of Working Example 1 was again repeated, this time using a film-casting slurry of 1 part polycarbonate of the type sold under the trade designation Lexan 141 by General Electric Company, 19 grams of the tin powder used in Example 1 and 9 grams of ethylacetate. When coated, dried, and leached on an article formed of polycarbonate, a peel strength of 3.1 lbs. per linear inch was attained.

When a non-porous precoat was used, i.e., when all or very nearly all of the solvent was evaporated from the precoat before it was washed in water, a peel strength of only 1.3 lbs. per linear inch was realized.

EXAMPLE 4

Again using the procedures set forth in Working Example 1, one part by weight of the sodium salt of a carboxymethyl-cellulose gum available under the trade designation 7M from Hercules Incorporated was dissolved in ethanol, and 10 parts of copper used in Working Example 2 was dispersed therein to form a coating composition according to the invention. The slurry was coated onto a polystyrene substrate, which was then immersed in a 1 molar solution of copper sulfate at room temperature for about five minutes to form the water-insoluble divalent copper salt of carboxymethylcellulose. The peel strengths of subsequently electroplated coatings on the thus coated substrate were, again, found to be improved. Peel strengths of about 3 lbs. per inch were obtained.

EXAMPLE 5

One part by weight of polyvinyl butyral, available under the trade designation, BUTVAR 76 from Monsanto Company, and 19 parts by weight of a spherical tin powder, available under the trade name MD 105 from Alcan Metal Powders Incorporated, were slurried in 5 parts of a solvent consisting of equal parts by weight of DMF and dimethylsulfoxide (DMSO). The resulting coating composition was coated onto a surface of a polymethyl methacrylate article and allowed to dry for 3 minutes at 65°C before being leached for 30 minutes in a water bath at 60°C. On being electroplated according to the process described in Example 1, an initial 90° peel strength of about 2.5 lbs. per inch was realized.

EXAMPLE 6

Compounding and Coating:

A general procedure is set forth herein. The specific quantities and kinds of conductive fillers used and the peel strengths obtained therewith are set forth in Table I. A solution was prepared comprising one part by weight of film-forming polymer, a polyvinylacetate (PVA) polymer available under the trade designation LEMAC–1000 from the Borden Chemical Company, and 9 parts of ethyl acetate. Then, a conductive filler was mixed under high shear into the solution, thereby forming a slurry.

The resulting slurry was coated on the acrylonitrile-butadiene-styrene copolymer plaque. A film coating 0.1 mil thick was applied to the non-conductive surface by means of a Gardner drawdown bar. The slurry and substrate temperature were both about 25°C during this coating step.

The film coating was dried in an air-circulating oven at 65°C for about 6 minutes in which time substantially all the solvent was removed. (This temperature was found to provide a sufficiently fast evaporation of ethyl acetate to provide micro-porosity but such evaporation was at a sufficiently moderate rate to avoid cracking of the precoat surface as it dried).

The electroplating and peel-strength testing steps were carried out as has been set forth above in Example 1.

| Precoat Slurry Composition | Run 1 | Run 2 | 3 | Run 4 |
|---|---|---|---|---|
| a. PVA Solution (parts by weight) | 10 | 10 | 10 | 10 |
| b. Nickel, structured (parts by weight) | 8 | 4.0 | 0.8 | 0 |
| c. Tin (parts by weight) | 0 | 4.0 | 7.2 | 10 |
| Peel Strength | 4.8 | 6.7 | 7.0 | 2.4 |

As will be evident from the foregoing table, the higher peel strengths were obtained with mixtures of the spherical and highly-structured fillers. However, in all cases where the highly-structured filler was used very high peel strengths were achieved compared to those achieved in Examples 1–5.

EXAMPLE 7

Compounding and Coating:

Two solutions were prepared comprising 700 gms film-forming polymer, a polyvinylacetate (PVA) polymer available under the trade designation LEMAC-1000 from the Borden Chemical Company, and 7,000 gms of ethyl acetate. Then, a conductive filler consisting of 5,600 gms of nickel (same as Example 6) and 320 gms of tin (same as Example 6) was mixed under high shear into the solution, thereby forming a slurry.

A 50 micron thick coating of each resulting slurry was coated on by means of a Gardner drawdown bar. The slurry and substrate temperature were both about 25°C during this coating step.

One film coating was dried in an air-circulating oven at 65°C for about 6 minutes and the other at room temperature (about 25°C) overnight.

The microporosity of each dried coating was photomicrographically observed to extend to a depth of about 10 microns and to be about 70 to 80 percent open space, with the major portion of the open space provided by pores ranging in size from 1 to 15 microns, although pores down to the 0.1 micron range were also observable.

Other embodiments will occur to those skilled in the art and are within the following claims.

What is claimed is:

1. A process for preparing a surface of a nonconductive substrate for reception of an electroplated coating comprising the steps of applying to said substrate a composition consisting essentially of a solution of a film-forming water-insoluble thermoplastic organic polymer in a solvent which is itself soluble in water, and mixed therewith electrically conductive metal particles having a largest dimension in the range of about 0.02 to 50 microns, said polymer occupying about 9 to 25 percent of the total volume of solution exclusive of said metal particles, said polymer and said metal particles being present in a ratio of 20 to 50 percent by volume of polymer to 80 to 50 percent by volume of metal particles based on the total volume of polymer and metal particles, evaporating said solution to leave a coating containing about 50 to 250 percent by volume of said solvent based on the volume of said film-forming polymer, and applying water to said coating to remove said solvent to form a coating having a microporous structure having about 40 to 90 percent open space, with said metal particles being exposed within the pores.

* * * * *